United States Patent [19]

Yenisey

[11] Patent Number: 5,343,192

[45] Date of Patent: Aug. 30, 1994

[54] FUSE OR CIRCUIT BREAKER STATUS INDICATOR

[75] Inventor: Osman M. Yenisey, Manalapan, N.J.

[73] Assignee: AT&T Bell Laboratories, Murray Hill, N.J.

[21] Appl. No.: 942,878

[22] Filed: Sep. 10, 1992

[51] Int. Cl.⁵ .................................................. G08B 21/00
[52] U.S. Cl. .................................... 340/639; 340/638; 335/17
[58] Field of Search ................... 340/638, 639; 335/17

[56] References Cited

U.S. PATENT DOCUMENTS

| H248 | 4/1987 | Middlebrooks | 340/639 |
|---|---|---|---|
| 2,317,030 | 7/1939 | Colvin | 340/639 |
| 4,281,322 | 7/1981 | Nasu et al. | 340/638 |
| 4,382,225 | 5/1983 | Peltz | 340/639 |
| 4,554,607 | 11/1985 | Mora | 340/639 |
| 4,581,674 | 4/1986 | Brozowski | 340/638 |
| 4,691,197 | 9/1987 | Damiano et al. | 340/638 |
| 4,857,896 | 8/1989 | Brooks | 340/639 |
| 4,931,778 | 6/1990 | Giajardo | 340/638 |
| 4,969,063 | 8/1990 | Scott et al. | 335/17 |

Primary Examiner—John K. Peng
Assistant Examiner—Edward Lefkowitz
Attorney, Agent, or Firm—Robert P. Marley

[57] ABSTRACT

A status indicator for monitoring a fuse or a circuit breaker, including optically isolated triggering and alarm circuits which can be integrated into a fuse holder or circuit breaker housing. More particularly, a status indicator having an LED connected in series with a fuse or circuit breaker across a power source, and a phototransistor arrangement, connected across the power source, in series with an alarm circuit. The arrangement is configured so that as long as current flows through the fuse or circuit breaker, the LED produces light which causes the phototransistor to be maintained in a non-conducting state, and the status indicator to remain in a non-alarm state. Upon failure of the fuse or circuit breaker, current flow to the LED is interrupted, resulting in the phototransistor being biased into a conductive state, and the alarm circuit being activated. A normally closed switch is employed to interrupt the current flow to the LED, thereby simulating fuse or circuit breaker failure, and providing a convenient manner for the on-line testing the status indicator. Multiple LEDs, each associated with a separate monitored fuse or circuit breaker, can be connected to a single normally closed switch, thereby facilitating the simultaneous testing of numerous status indicators through the actuation of a single switch.

14 Claims, 4 Drawing Sheets

FUSE OR CIRCUIT BREAKER STATUS INDICATOR

TECHNICAL FIELD

The invention relates to devices indicating the status of a fuse or circuit breaker and, more particularly, devices providing a visual or audible indication of such.

BACKGROUND OF THE INVENTION

In electronic systems, individual circuit components are typically protected from short-circuiting and excessive currents by a fuse or a circuit breaker interposed between the component and a power supply. Large numbers of such protection devices may be found within any given system, depending upon the number of individual components contained therein. This has given rise to the need for fuse and circuit breaker status indicators which allow for the easy and rapid location of a tripped, failed or "blown" protection device within an electronic system. Typically, these indicators are incorporated into a fuse holder or circuit breaker housing, and trigger an alarm which serves to alert service personnel that a particular protection device has blown or tripped; the alarm can be an electromechanical flag, a light emitting diode ("LED"), a lamp, or an audible signal.

Such fuse and/or circuit breaker status indicators must remain electrically isolated from the circuits being protected to ensure they do not affect the performance of the protected circuits. In addition, the indicators must not significantly compromise the isolation between the protected circuitry and the power source after a fuse has blown or a circuit breaker tripped. Furthermore, the indicators should be capable of being easily tested, while on-line, to determine if the particular alarm (i.e. a flag, LED, lamp, or audible signal) is operational. In electronic systems employing large numbers of such status indicators, it is often preferable to test all the indicators at once.

Present circuit protection device status indicators fail to provide the desired degree of isolation from the protected circuity, maintain the isolation between the protected circuit and the power supply, and allow for the easy, simultaneous on-line testing of large numbers of indicators.

SUMMARY OF THE INVENTION

The aforementioned problems are solved, in accordance with the principles of the invention, by providing a status indicator for monitoring a fuse or a circuit breaker, including triggering and alarm circuits that are optically isolated from each other, and which can be integrated into a fuse holder or circuit breaker housing. More particularly, a status indicator having an LED connected in series with a fuse or circuit breaker across a power source, and a phototransistor arrangement, connected across the power source, in series with an alarm circuit. The arrangement is configured so that as long as current flows through the fuse or circuit breaker, the LED produces light which causes the phototransistor to be maintained in a non-conducting state, and the status indicator to remain in a non-alarm state. Upon failure of the fuse or circuit breaker, current flow to the LED is interrupted, resulting in the phototransistor being biased into a conductive state, and the alarm circuit being activated. A normally closed switch is employed to interrupt the current flow to the LED, thereby simulating a fuse failure, and providing a convenient means for the on-line testing the status indicator. Multiple LEDs, each associated with a separate monitored fuse or circuit breaker, can be connected to a single normally closed switch, thereby facilitating the simultaneous testing of numerous status indicators through the actuation of a single switch.

DETAILED DESCRIPTION

Figure 1:
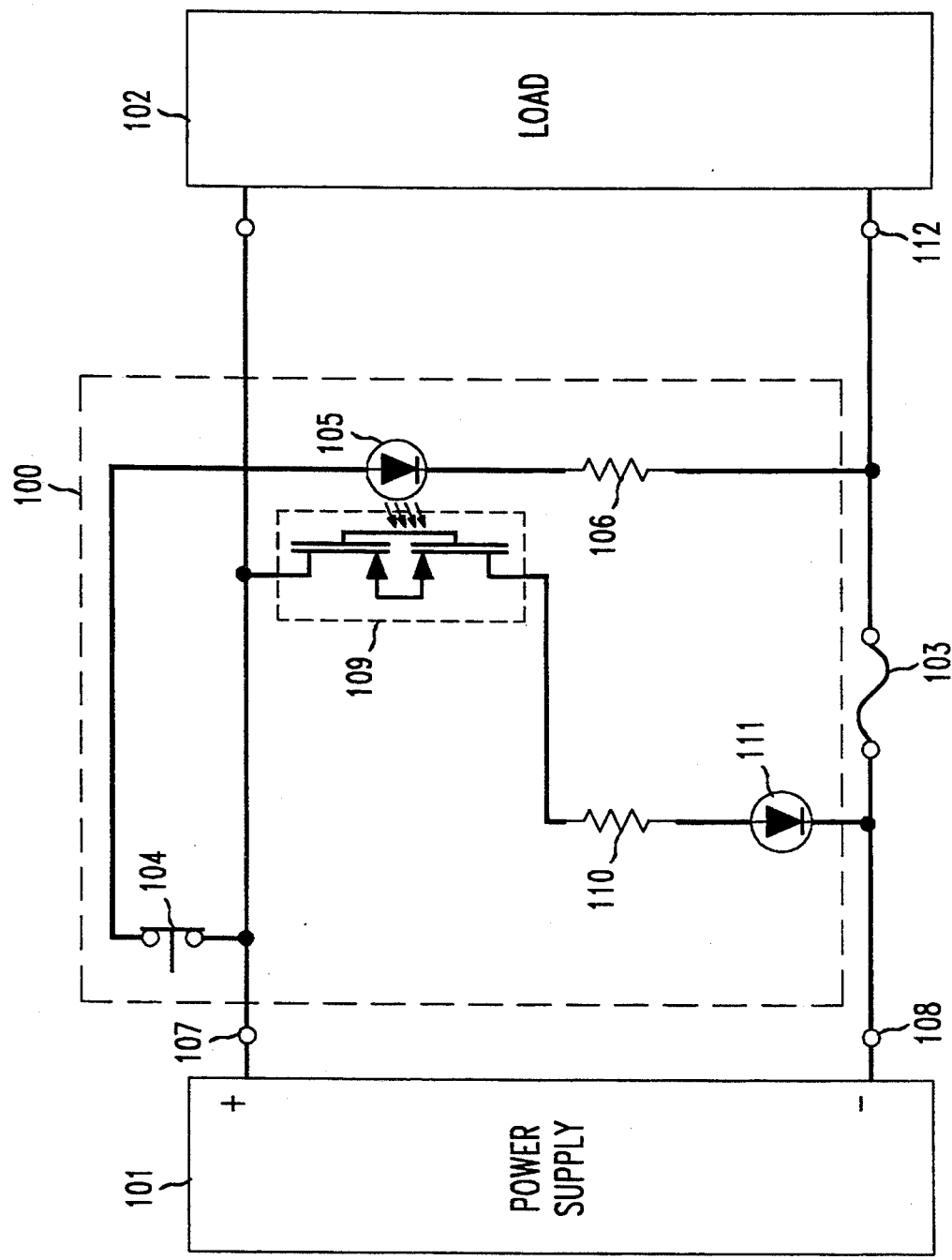
FIG. 1 is a schematic diagram showing a particular embodiment of the invention incorporated into an electrical system having a power supply, a load, and a fuse.

FIG. 1 is a schematic diagram showing a particular embnodiment of the invention (100) incorporatd into an electrical system having a power supply (101), a load (102), and a fuse (103). As shown, normally-closed switch 104, LED 105, limiting resistor 106, and fuse 103 are serially connected between positive power supply line 107 and negative power supply line 108. Depletion-mode photo-MOS transistor ("phototransistor") 109, limiting resistor 110, and alarm LED 111 are serially connected between positive power supply line 107 and negative power supply line 108. Fuse 103 connects negative supply line 108 and negative load supply line 112. Phototransistor 109 is optically coupled to LED 105. In practice, both LED 105 and phototransistor 109 can be contained in a single optoisolator, such as the AQV414 solid- state relay, manufactured by Aromat Corporation of Westfield, New Jersey. In order to minimize the physical impact of employing the invention in pre-exisiting electrical systems, the components of the invention (105, 106, 109, 110, and 111) can be incorporated within a standard size fuse holder.

As long as fuse 103 is intact, and switch 104 is in a closed position, current flows through LED 105, and resistor 106, thereby causing LED 105 to illuminate. Resistor 106 serves to limit the current passing through LED 105. Light from LED 105 causes phototransistor 109 to be placed in a non-conducting state, thereby prohibiting current from flowing through limiting resistor 110 and alarm LED 111. As a result, alarm LED 111 is not illuminated (an indication that fuse 103 is intact).

If fuse 103 fails (i.e., blows), current is prohibited from flowing through LED 105 and resistor 106, and as a result LED 105 is not illuminated. Without incident light frm LED 105, phototransistor 109 is placed in a conducting state, and current flows through limiting resistor 110 and alarm LED 111. This causes alarm LED 111 to illuminate and provide a visual indication that fuse 103 has blown.

In order to test the fuse indicator, LED 105 can be momentarily darkened when fuse 103 is intact by depressing switch 104. The switch interrupts current flow through LED 105 and resistor 106 (without effecting the current supplied to the load), and causes LED 105 to be temporarily switched off. In response, phototransistor 109 is momentarily placed in a conductive state, and alarm LED 111 illuminates (mimicking the indicator's response to a failed fuse).

Figure 2:
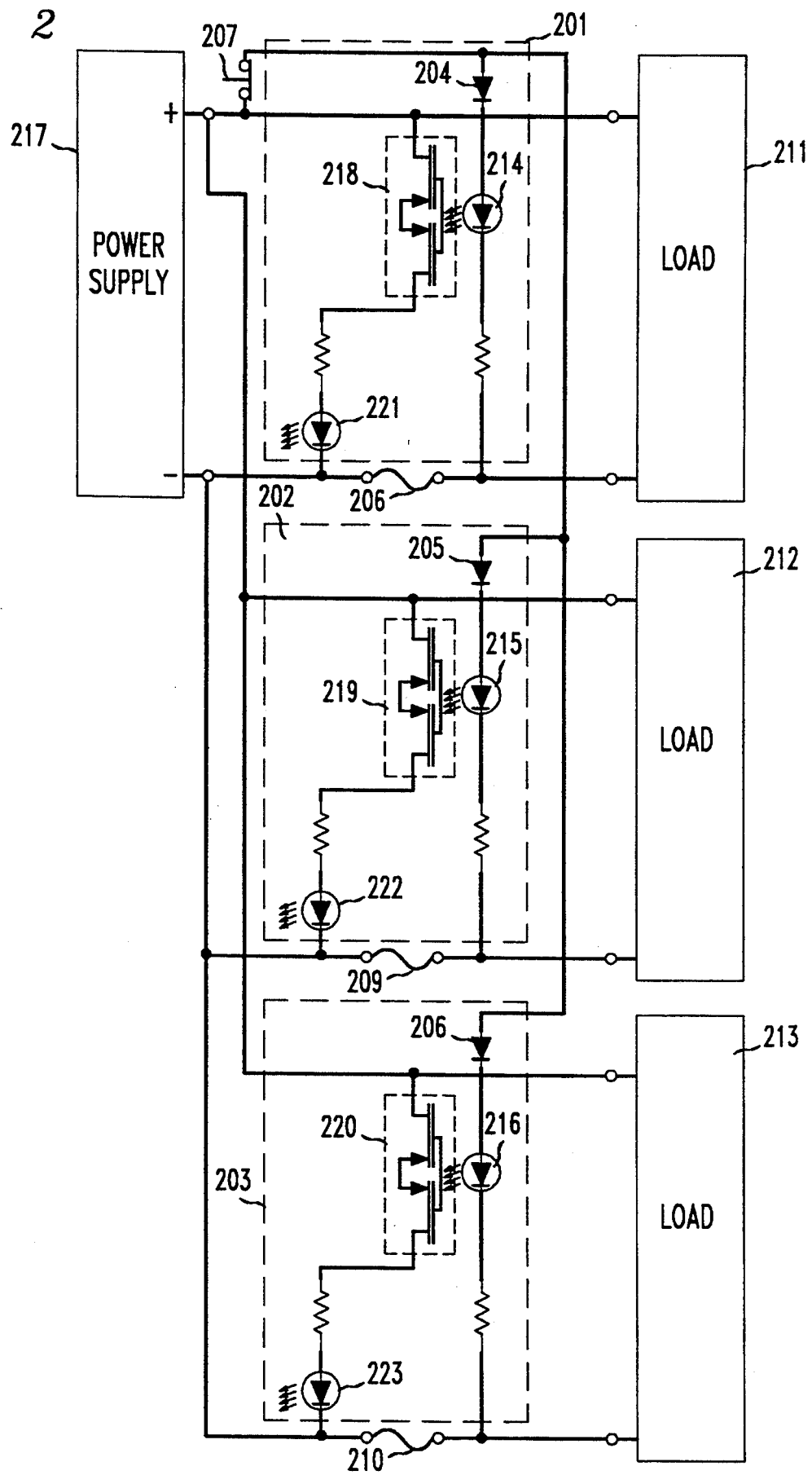
FIG. 2 is a schematic diagram showing an electrical system including three fuse status indicators, each of which has a configuration similar to the indicator illustrated in FIG. 1.

FIG. 2 is a scematic diagram showing an electrical system including three fuse status indicators, 201, 202, and 203; each of which has a configuration similar to the indicator illustrated in FIG. 1. However, diodes 204, 205, and 206 have been incorporated to prevent a series connection from the load terminal of one fuse holder to the load terminal of another when switch 207 is depressed. The indicators are employed to monitor the status of fuses 208, 209, and 210, which protect three separate loads (211, 212, and 213 respectively). Each of the fuse status indicators operate in a manner similar to that of the indicator illustrated in FIG. 1. As shown in FIG. 2, the current supplied to LEDs 214, 215, and 216 by power supply 217 can be interrupted via a single normally-closed switch (207), without effecting the current supplied to the loads. By actuating switch 207, LEDs 214, 215, and 216 can be momentarily darkened when fuses 208, 209, and 210 are intact. In response, phototransistors 218, 219, and 220 are momentarily placed in a conductive state, and alarm LEDs 221, 222, and 223 are simultaneously illuminated.

Electrical system incorporating any number of fuse status indicators may be configured similarly to the electrical system illustrated in FIG. 2., without any special wiring. Current can be supplied to each LED optically coupled to each phototransistor within the indicators via a single switch. The single switch enables the simultaneous testing of all fuse status indicators.

Figure 3:
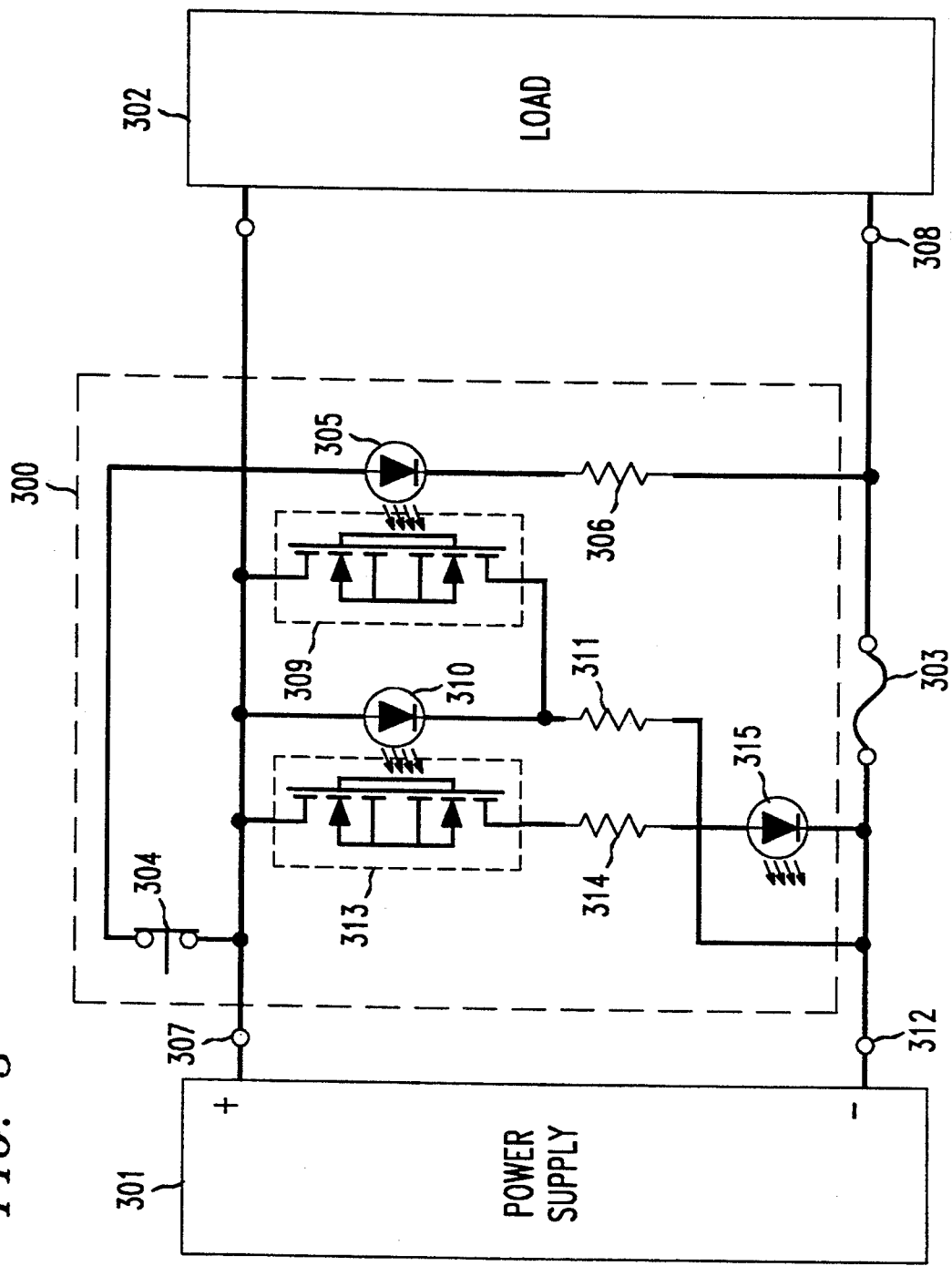
FIG. 3 is a schematic diagram showing a second embodiment of the invention incorporated into an electrical system having a power supply, a load, and a fuse.

FIG. 3 is a schematic diagram showing a particular embodiment of the invention (300) incorporated into an electrical system having a power supply (301),a load (302), and a fuse (303). As shown, normally-closed switch 304, LED 305, and limiting resistor 306 are serially connected between positive power supply line 307 and negative power input 308 of load 302. Enhancement-mode phototransistor 309, which is optically coupled to LED 305, is connected across LED 310. LED 310 and limiting resistor 311 are serially connected between positive power supply line 307 and negative power supply line 312. Enhancement-mode phototransistor 313, limiting resistor 314, and alarm LED 315 are serially connected between positive power supply line 307 and negative power supply line 312. Fuse 303 connects negative power supply line 312 and negative power input 308. Enhancement-mode phototransistor 313 is optically coupled to LED 310. As with the previously described embodiments, the optically coupled LED and phototransistor pairs can each be contained in single opto- isolator. The physical impact of employing the invention in pre- existing electrical systems can be minimized by incorporating the components of the invention (305, 306, 309, 310, 311, 313, 314, and 315) within a standard size fuse holder.

As long as fuse 303 is intact, and switch 304 is in a closed position, current flows through LED 305 and resistor 306, thereby causing LED 305 to illuminate, Light from LED 305 causes phototransistor 109 to be placed in a conducting state, effectively shorting the leads of LED 310 and thereby prohibiting LED 310 from illuminating. As a result, phototransistor 313 is placed in a non-conductive state, prohibiting current from flowing through limiting resistor 314 and alarm LED 315. As a result, alarm LED 315 is not illuminated (an indication that fuse 303 is intact).

If fuse 303 fails (i.e., blows), current is prohibited from flowing through LED 305 and resistor 306, and as a result LED 305 is not illuminated. Without incident light from LED 305, phototransistor 309 is placed in a non-conducting state, allowing LED 310 to illuminate as a result of current flowing through limiting resistor 311. The light from LED 310 causes phototransistor 313 to allow current to flow through limiting resistor 314 and alarm LED 315. Alarm LED 315 illuminates to provide a visual indication that fuse 303 has blown.

To test the fuse indicator, LED 305 can be momentarily darkened when fuse 303 is intact by depressing switch 304. The switch interrupts current flow through LED 305 and resistor 306 (without effecting the current supplied to the load), and causes LED 305 to be temporarily switched off. In response, phototransistor 309 is momentarily placed in a non-conductive state, LED 310 illuminates, causing phototransistor 313 to conduct, and alarm LED 315 to illuminate (mimicking the indicator's response to a failed fuse).

The embodiment of the invention illustrated in FIG. 3 may be employed in an electrical system containing any number of fuse status indicators (in a configuration similar to the system illustrated in FIG. 2). Each of the indicators can be connected to a single switch to enable the simultaneous testing of multiple indicators.

Figure 4:
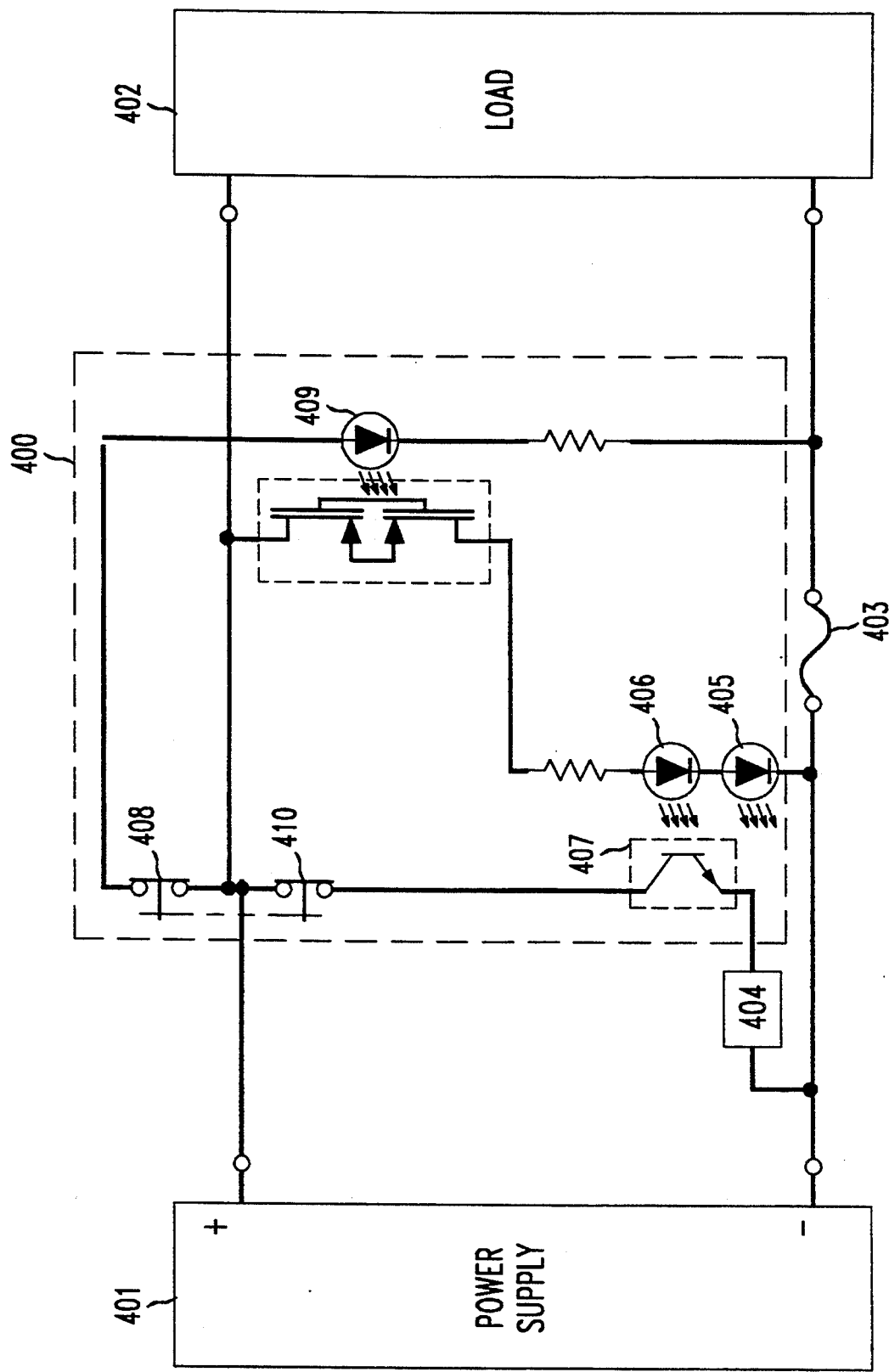
FIG. 4 is a schematic diagram showing a third embodiment of the invention incorporated into an electrical system having a power supply, a load, a fuse, and a bell.

FIG. 4 is a schematic diagram showing a third embodiment of the invention (400) incorporated into an electrical system having a power supply (401) a load (402), a fuse (403) and an audible alarm bell (404). The operation of this embodiment is similar to that of the embodiment illustrated in FIG. 1 in that visual alarm LED 405 illuminates as a result of fuse 403 blowing. However, a second LED 406 (which may be an infrared emitting diode) also illuminates in response fuse 403 blowing. Phototransistor 407, which is optically coupled to LED 406, is placed in a conductive state as a result of the illumination of LED 406, allowing current to flow through bell 404 to produce an audible alarm signal. The indicator may be tested by depressing switch 408 which momentarily darkens LED 409 and causes LEDs 405 and 406 to illuminate. A second switch (410) is mechanically coupled to switch 408 so that bell 404 is prevented from sounding during the testing of the indicator.

The above-described invention provides a simple, reliable, and practical fuse status monitoring device. It will be understood that the particular embodiments described are only illustrative of the principles of the present invention, and that various modifications could be made by those skilled in the art without departing from the scope and spirit of the present invention, which is limited only by the claims that follow.

One such modification would include substituting an alternate signaling device (such as lamp, an electromechanical flag, or an audible signal generator) for the alarm LED in any of the above described embodiments. Another such modification would include an indicator adapted to monitor a fuse serially connected to a positive power supply line. The invention could also be applied to monitor the status of a circuit breaker, or any other type of circuit element which changes from an electrically closed state to an electrically open state.

I claim:

1. In an electrical system including a power source having a first output terminal and a second output terminal, a load having a first input terminal and a second input terminal, a connection between said first output terminal of said power source and said first input terminal of said load, and a fuse serially connected between said second output terminal of said power source and said second input terminal of said load, an apparatus for monitoring the status of said fuse, comprising:

a light source connected between said first output terminal of said power source and said second input terminal of said load so that said light source is illuminated when said fuse is intact, and not illuminated when said fuse has failed;

means adapted to momentarily prevent current from flowing through said light source without preventing the flow of current through said fuse, and thereby simulate the failure of said fuse;

indicator means responsive to the flow of current; and switching means linking said indicator means and said power supply, said switching means optically coupled to said light source, and adapted to prevent current from flowing from said power supply to said indicator means in response to light generated by said light source.

2. The invention of claim 1 wherein said light source is a light emitting diode.

3. The invention of claim 1 wherein said switching means includes a photo-sensitive transistor.

4. The invention of claim 1 wherein said indicating means includes a light emitting diode.

5. The invention of claim 1 wherein said indicating means includes an audible signal generator.

6. The invention of claim 1 wherein said indicating means includes a mechanical signaling device.

7. The invention of claim 1 wherein said indicating means includes a lamp.

8. In an electrical system including a power source having a first output terminal and a second output terminal, a load having a first input terminal and a second input terminal, a connection between said first output terminal of said power source and said first input terminal of said load, and a circuit breaker serially connected between said second output terminal of said power source and said second input terminal of said load, an apparatus for monitoring the status of a circuit breaker, comprising:

a light source connected between said first output terminal of said power source and said second input terminal of said load so that said light source is illuminated when said circuit breaker is in a closed circuit state, and not illuminated when said circuit breaker is in an open circuit state;

means adapted to momentarily prevent current from flowing through said light source without preventing the flow of current through said circuit breaker, and thereby simulate the failure of said circuit breaker;

indicator means responsive to the flow of current; and switching means linking said indicator means and said power supply, said switching means optically coupled to said light source, and adapted to prevent current from flowing from said power supply to said indicator means in response to light generated by said light source.

9. The invention of claim 8 wherein said light source is a light emitting diode.

10. The invention of claim 8 wherein said switching means includes a photo-sensitive transistor.

11. The invention of claim 8 wherein said indicating means includes a light emitting diode.

12. The invention of claim 8 wherein said indicating means includes an audible signal generator.

13. The invention of claim 8 wherein said indicating means includes a mechanical signaling device.

14. The invention of claim 8 wherein said indicating means includes a lamp.

* * * * *